US012570017B2

(12) United States Patent
Dewey et al.

(10) Patent No.: US 12,570,017 B2
(45) Date of Patent: Mar. 10, 2026

(54) CUTTING DISC AND CUTTING DEVICE FOR CHOPPING FOOD PRODUCTS

(71) Applicant: VORWERK & CO. INTERHOLDING GMBH, Wuppertal (DE)

(72) Inventors: Roland Dewey, Solingen (DE); Ingo Ehring, Bottrop (DE); Andreas Heynen, Radevormwald (DE); Kai Landsecker, Düsseldorf (DE); Michael Sickert, Ennepetal (DE)

(73) Assignee: VORWERK & CO. INTERHOLDING GMBH (DE)

( * ) Notice: Subject to any disclaimer, the term of this patent is extended or adjusted under 35 U.S.C. 154(b) by 205 days.

(21) Appl. No.: 17/845,463

(22) Filed: Jun. 21, 2022

(65) Prior Publication Data

US 2023/0016027 A1     Jan. 19, 2023

(30) Foreign Application Priority Data

Jul. 14, 2021     (EP) ..................................... 21185467

(51) Int. Cl.
| | |
|---|---|
| *B26D 1/143* | (2006.01) |
| *A47J 43/07* | (2006.01) |
| *A47J 43/25* | (2006.01) |
| *B26D 1/00* | (2006.01) |
| *B26D 1/29* | (2006.01) |
| *B26D 3/10* | (2006.01) |
| *B26D 9/00* | (2006.01) |

(52) U.S. Cl.
CPC ............ *B26D 1/143* (2013.01); *A47J 43/255* (2013.01); *B26D 3/10* (2013.01); *B26D 2210/02* (2013.01)

(58) Field of Classification Search
CPC ........ B26D 1/143; B26D 1/0006; B26D 3/10; B26D 2210/02; B26D 2001/0053; B26D 9/00; B26D 1/29; A47J 43/255; A47J 43/0711; A47J 43/0722
USPC ........................................................... 241/92
See application file for complete search history.

(56) References Cited

U.S. PATENT DOCUMENTS

| | | | | |
|---|---|---|---|---|
| 4,199,112 A | * | 4/1980 | McLean | .................. A47J 43/06 241/92 |
| 4,560,111 A | * | 12/1985 | Cavalli | .................... B26D 3/22 241/286 |

(Continued)

FOREIGN PATENT DOCUMENTS

| | | | |
|---|---|---|---|
| DE | 4224428 | 1/1994 | |
| DE | 4224428 A1 | * 1/1994 | .......... A47J 43/0722 |

(Continued)

OTHER PUBLICATIONS

English translate (WO2013160610A1), retrieved date Apr. 29, 2024.*

(Continued)

*Primary Examiner* — Mohammed S. Alawadi
(74) *Attorney, Agent, or Firm* — Barnes & Thornburg LLP

(57) ABSTRACT

A cutting disc configured to chop food products by rotating about an axis. There are cutting elements which are located on a first side of the cutting disc and which can chop food products by rotating the cutting disc in a first direction of rotation and which are arranged one behind the other when viewed in the first direction of rotation. The cutting elements arranged one behind the other are different.

20 Claims, 5 Drawing Sheets

(56)                    References Cited

U.S. PATENT DOCUMENTS

| 2003/0226923 | A1* | 12/2003 | Starr | ..................... | A47J 43/046 |
| | | | | | 241/282.1 |
| 2014/0061344 | A1* | 3/2014 | Conti | .................... | A47J 43/255 |
| | | | | | 241/296 |
| 2019/0014948 | A1* | 1/2019 | Cheung | ............... | A47J 43/0722 |
| 2020/0324427 | A1* | 10/2020 | Guyatt | ................ | A47J 43/0722 |

FOREIGN PATENT DOCUMENTS

| FR | | 2567442 | A1 | * | 1/1986 | | |
| WO | | WO-2012004511 | A1 | * | 1/2012 | .............. | A47J 43/07 |
| WO | | WO2013160610 | | | 10/2013 | | |
| WO | | WO-2013160610 | A1 | * | 10/2013 | .......... | A47J 43/0716 |

OTHER PUBLICATIONS

English translate (FR2567442A1), retrieved date Mar. 13, 2025.*
English translate (DE4224428A1), retrieved date Mar. 13, 2025.*
English translate (W2012004511A1), retrieved date Mar. 13, 2025.*
Search Report for Application No. EP21185467.4 dated Jan. 11, 2022 (2 pages).

* cited by examiner

CUTTING DISC AND CUTTING DEVICE FOR CHOPPING FOOD PRODUCTS

CROSS-REFERENCE TO RELATED APPLICATION

This application claims benefit of priority from European Application No. 21185467.4, filed Jul. 14, 2021, the disclosure of which is hereby incorporated in its entirety by reference herein.

TECHNICAL HELD

The disclosure relates to a cutting disc and a cutting device for chopping food products.

BACKGROUND

A kitchen appliance with a cutting device is known from the publication EP 3 427 621 A1. The cutting device comprises a rotatable cutting disc with which a food product can be chopped.

SUMMARY

A cutting disc the present disclosure is intended and suitable for chopping food products in a kitchen. The cutting disc therefore consists of a material that is resistant to common food products that are chopped by cutting discs. For example, the cutting disc may consist entirely or at least partially of stainless steel or aluminum. The cutting disc may consist partially of plastic. The cutting disc is in principle a circular body whose radius is many times greater than its thickness. The cutting disc typically has a diameter that is greater than 10 cm and/or less than 30 cm. Typically, the overall height of the cutting disc is less than 30 mm.

The cutting disc is configured such that it can be rotated about an axis in order to chop food products. A shaft may therefore be attached to the cutting disc or the cutting disc is configured such that a shaft can be attached to the cutting disc. For this purpose, the cutting disc may have a central opening and/or one or more openings at the center of the cutting disc, which serve to attach a shaft. The central opening can be non-rotationally symmetrical in order to be able to transmit a rotational movement of a shaft, which is passed through the central opening, to the cutting disc. One or more openings grouped around a center of the cutting disc may alternatively or additionally serve to allow a torque to be transmitted from a shaft to the cutting disc. In order to be able to store and transport the cutting device in a space-saving manner without great effort, the cutting disc can advantageously be detached from the shaft without having to use tools for this purpose. The shaft may consist of plastic to keep the manufacturing effort and weight low. However, the shaft can also be made of metal.

To enable the cutting disc to chop food products, there are cutting elements on a first side of the cutting disc. The cutting elements are so that they chop a food product when the cutting disc is rotated in a first direction of rotation and the food product lies against the first side (is in contact with the first side). Chopping is then performed by cutting edges of the cutting elements. The cutting disc has openings through which chopped food product can pass through the cutting disc.

In principle, the cutting elements cannot chop the food product lying against the first side if the cutting disc is rotated in the opposite second direction of rotation.

The cutting elements are arranged in principle one behind the other when viewed in the first direction of rotation. If a food product lies against the first side and if the cutting disc is rotated in the first direction of rotation, the food product is first chopped by a cutting element that is then located at the front and then by a second cutting element, which is then located behind the first cutting element when viewed in the first direction of rotation. The front cutting element or the front cutting elements in this sense preferably differ from the one or more cutting elements located behind. In particular, the cutting elements have differently shaped cutting edges. For example, one cutting edge may be curved and the differently shaped cutting edge may be entirely straight or at least almost entirely straight. Both cutting edges may also be curved, whereby the cutting edges differ in width.

Curved means an arcuate course or a course that approximates an arcuate course. A cutting edge that runs predominantly straight and has a curved course only at the edge region for manufacturing and/or attachment reasons is not a curved cutting edge of the present disclosure. By a cutting element with a curved course of its cutting edge, a food product can be chopped in strip form, but not in slice form. By a cutting element with a straight cutting edge, a food product can typically be chopped in slice form.

A virtually entirely straight cutting edge runs in principle parallel to the adjacent main surface of the cutting disc.

By providing cutting elements which are arranged one behind the other and which differ from each other, the smooth running of the cutting disc during chopping can be improved.

DETAILED DESCRIPTION

Figure 1:
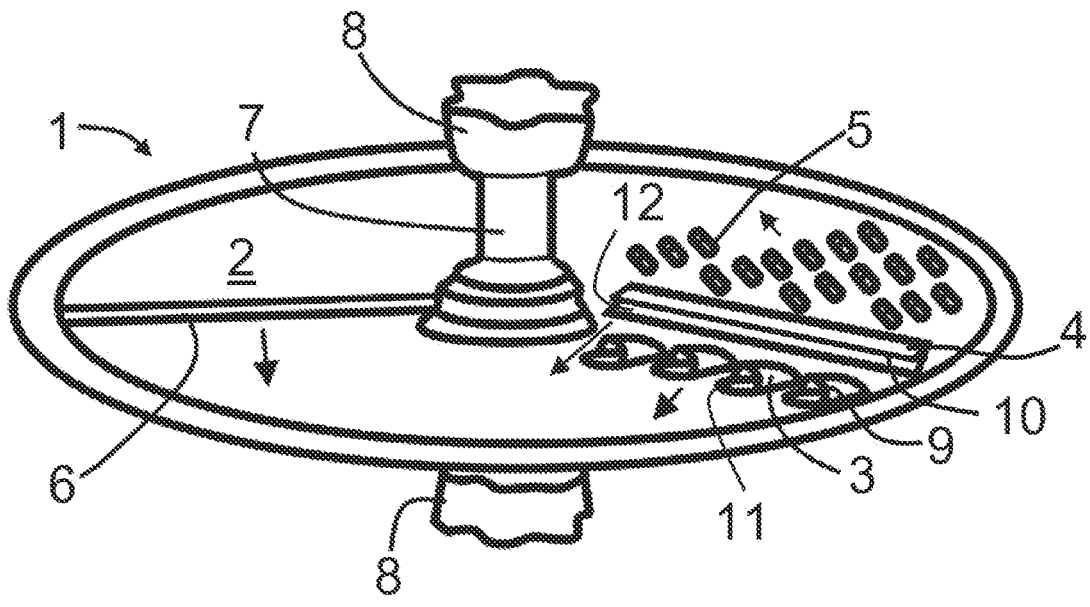
FIG. 1 illustrates a cutting disc with inclined view on first side.
Figure 2:
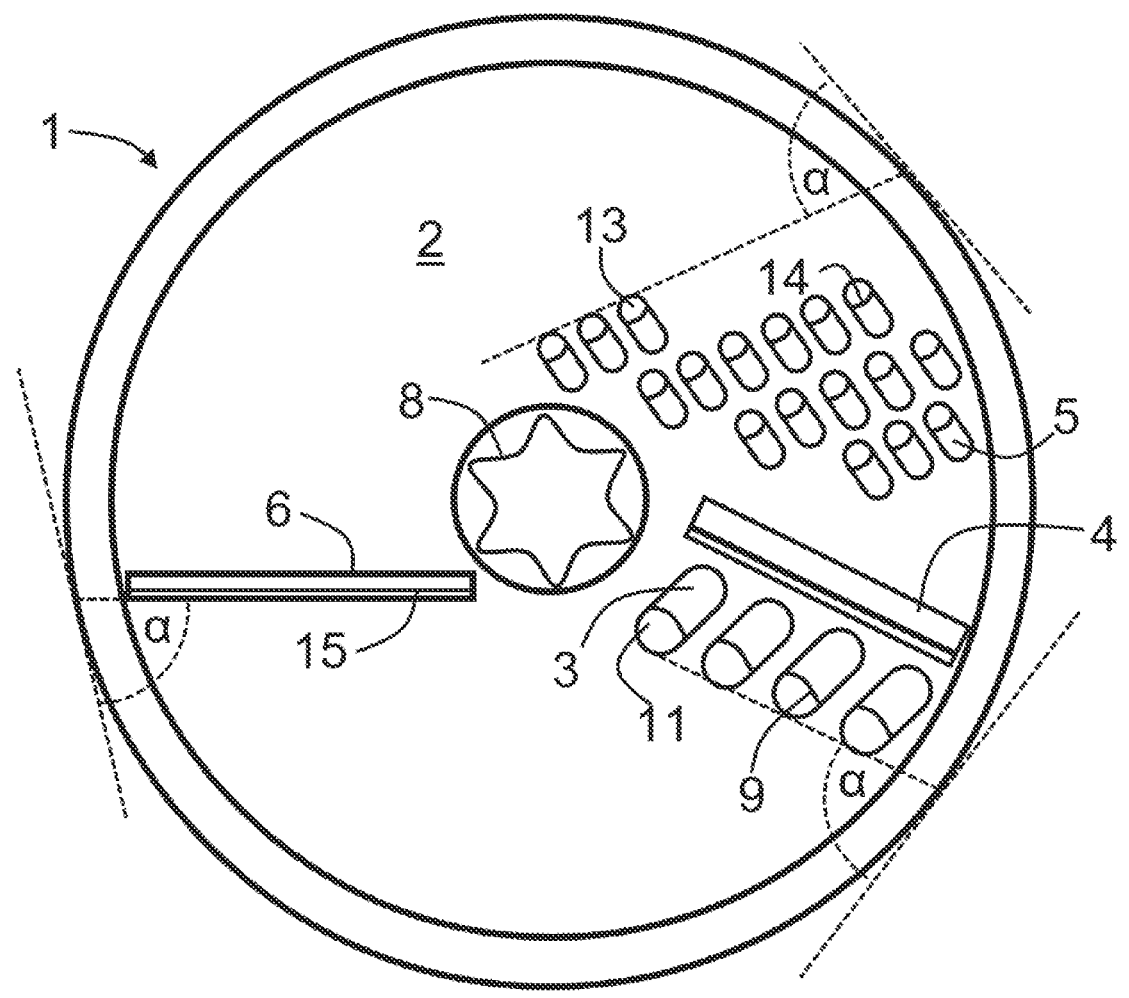
FIG. 2 illustrates a top view on cutting disc.

FIGS. 1 and 2 show a cutting disc 1 for a cutting device. Cutting elements 3, 4, 5 protrude upwards from a main surface 2 of the cutting disc 1. The cutting elements 3, 4, 5 are therefore located on a first side of the cutting disc 1. FIG. 1 shows an inclined view of the cutting disc 1. FIG. 2 shows a top view of the cutting disc 1.

There is a slot 6 which serves as a through opening for chopped food product. The associated cutting element is a blade with a straight cutting edge, which is located on the opposite second side of the cutting disc 1.

A shaft 7 passes through the center of the cutting disc 1. There are identical coupling elements 8 at both ends of the shaft 7. The coupling elements 8 protrude equally far from the respective main surfaces of the cutting disc 1. Both coupling elements 8 can therefore be connected in the same way to a corresponding coupling element, wherein the corresponding coupling element may be a coupling element of a motor shaft.

The cutting elements 3 have arcuate cutting edges 9 and are otherwise shaped like a hood. Below each of the cutting edges 9 there is a through opening 11 for food product that has been chopped by the cutting edges 9. The cutting element 4 arranged behind the cutting elements 3 has a straight cutting edge 10. Below the straight cutting edge 10 there is a through opening 12 for food product that has been chopped by the straight cutting edge 10. The through opening 12 is a slot, which may be rectangular. Both cutting elements 3 and 4 chop a food product lying against the main surface 2 when the cutting disc 1 is rotated clockwise in a first direction of rotation. Both cutting elements 3 and 4 do not chop a food product lying against the main surface 2 when the cutting disc 1 is rotated counterclockwise in a second direction of rotation.

Seen from the main surface 2, the cutting elements 3 with the arcuate cutting edges 9 are three millimeters high. The arcuate cutting edge 9 thus protrudes up to three millimeters from the main surface 2. The cutting elements 3 chop a food product into strip form. The maximum thickness of a food product chopped in strip form corresponds to the maximum height of the cutting edges 9 and is therefore just under 3 mm. The maximum height of the arcuate cutting edges 9 therefore corresponds to the thickness of the strips cut from a food product.

The distance between the straight cutting edge 10 of the cutting element 4 arranged immediately behind and the main surface 2 is also three millimeters. If the cutting elements 3 with the arcuate cutting edges 9 were not present, the cutting element 4 would chop a food product lying against the main surface 2 into slice form if the cutting disc 1 were rotated in the first direction of rotation. However, since the approximately three-millimeter-thick strips are practically always first cut from a food product by the cutting elements 3 with the arcuate cutting edges 9, the cutting element 4 with the straight cutting edge 10 also cuts approximately three millimeter thick strips from a food product.

Seen from the cutting element 4 with the straight cutting edge 10 in the first direction of rotation, the distance to the cutting elements 3 with the arcuate cutting edges 9 is small and is, for example, no more than 40 mm. Seen from the cutting elements 3 with the arcuate cutting edges 9 in the first direction of rotation along the circular path, the distance to the cutting element 4 with the straight cutting edge 10 is large and is a multiple of 40 mm. By distance is meant the distance along a circular arc parallel to the outer circumference of the cutting disc 1.

Instead of the distance, the angle of rotation can be considered by which the cutting disc 1 must be rotated in order for a food product to be chopped by both cutting elements 3 and 4. If a food product is chopped by the cutting elements 3 with the arcuate cutting edges 9, the angle of rotation is small in order to subsequently chop the food product by the cutting element 4 with the straight cutting edge 10. If a food product is chopped by the cutting element 4 with the straight cutting edge 10, the angle of rotation is large in comparison, namely many times larger, in order to subsequently chop the food product by the cutting elements 3 with the arcuate cutting edges 9. This arrangement has the effect that practically only strips are cut out of a food product and not a slice in a first revolution, if rotation is performed in the first direction of rotation.

A large number of hood-shaped cutting elements 5 protrude upwards from the main surface 2 which also have arcuate cutting edges. The cutting elements 5 are distributed over a two-dimensional area. The cutting elements 5 chop a food product into strip form when the cutting disc 1 is rotated in the second direction of rotation and thus counterclockwise. The cutting elements 5 are smaller than the cutting elements 3. The cutting elements 5 are 1 mm high when viewed from the main surface 2. The cutting edges of the cutting elements 5 therefore protrude a maximum of 1 mm upwards from the main surface 2. Strips approx. 1 mm thick can therefore be cut out of a food product.

On the underside at slot 12, there is a blade of a cutting element running parallel to slot 12, which is located on the other side of cutting disc 1. Two cutting elements with straight cutting edges therefore have a common through opening 12.

The cutting elements 3 are arranged next to each other slightly offset along an imaginary line in such a way that a food product to be chopped is conveyed increasingly towards the outer edge of the cutting disc 1 during chopping, as indicated by an arrow in FIG. 1. The imaginary line therefore forms an angle α of less than 90° with the outer edge (see FIG. 2).

The slot 12 and thus also the cutting edge 10 running parallel to it form an angle α of less than 90° with the outer edge of the cutting disc 1. This also ensures that a food product to be chopped is increasingly conveyed in the direction of the outer edge of the cutting disc 1 during chopping. The upwardly protruding blade of the cutting element 4 thus acts centrifugally on a food product due to its arrangement when the upwardly protruding blade chops a food product.

Hood-shaped cutting elements 5 are arranged slightly offset next to each other along an imaginary line in such a way that this imaginary line encloses an angle α smaller than 90° with the outer edge of the cutting disc 1. There are several rows of slightly offset hood-shaped cutting elements 5 arranged next to each other. Thus, a food product to be chopped is increasingly conveyed in the direction of the outer edge during chopping, as indicated by an arrow in FIG. 1, when the cutting disc 1 is rotated in the second direction of rotation. Thus, the upwardly protruding cutting elements 19 act centrifugally on a food product due to their arrangement when the upwardly protruding cutting elements 19 are chopping a food product.

Food products are conveyed to the outer edge of the cutting disc and held there. The position of the food products can thus be stabilized, which leads to particularly uniform chopping results.

In order to further promote the conveying of a food product to the outer edge of the cutting disc 1 in an improved manner, initially only a few cutting elements 5 may be present at the front which lie in a row at the center of the cutting disc 1 when viewed in the second direction of rotation, i.e. which have a relatively large distance from the outer edge of the cutting disc 1. In FIGS. 1 and 2, only three such front cutting elements 5 are shown by way of example. Behind them, there is a row of cutting elements 5 that extends significantly closer to the outer edge of the cutting disc 1. A total of six such cutting elements 5 are shown in a second row in FIGS. 1 and 2. The cutting elements 5 in the first row are thus advantageously few in number compared to the cutting elements 5 in the second row. Behind this, there may be a third row of cutting elements 5 which extends even further to the outer edge of the cutting disc 1. By way of example, five such cutting elements 5 in a third row are shown in FIGS. 1 and 2. The number of cutting elements 5 in the third row may be less than the number of cutting elements 5 in the second row, since previously there were already cutting elements 5 at the center of the cutting disc 1 that were able to chop a food product into strip form. In addition, a food product has typically already been conveyed to the outer edge of the cutting disc 1.

There may be a fourth row of cutting elements 5 that reaches very close to the outer edge of the cutting disc 1. Since a food product has already been chopped close to the center of the cutting disc, even fewer cutting elements 5 are sufficient in the last row. In FIGS. 1 and 2, three such cutting elements 5 are shown in the last row. In addition, a food product has typically already been conveyed to the outer edge of the cutting disc 1, so that in the fourth row cutting elements 5 at the center are also therefore dispensable.

In general, a first row in the front should be adjacent to the center, but not to the outer edge. A first row in the front is formed by only a few cutting elements, in particular compared to a row of cutting elements located behind it. In general, a rear last row should not be adjacent to the center, but to the outer edge. A rear last row is formed by only a few cutting elements, especially compared to a row of cutting elements in front of it. Middle rows tend to move away from the center of the cutting disc and towards the outer edge. However, there may also be a middle row that extends from the center to the outer edge.

The cutting elements 3, 4 and 5 are located close to each other in order to achieve smooth running. The area of half a cutting disc 1 is therefore sufficient for the arrangement of all cutting elements with the exception of the cutting element of the through opening 6 on the opposite side.

In FIG. 2, the through openings 13 and the arcuate cutting edges 14 of the cutting elements 5 can be seen, as well as the straight cutting edge 15 associated with the through opening 6.

Figure 3:
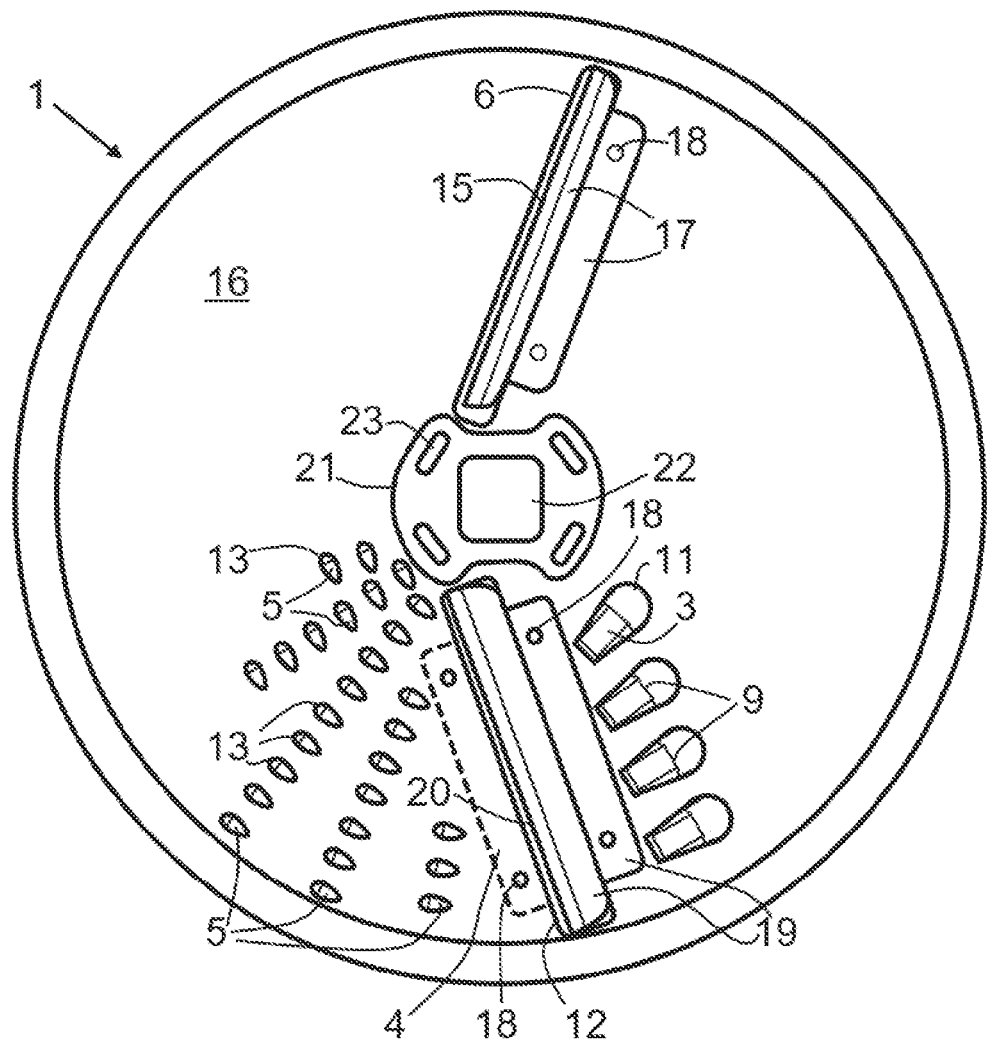
FIG. 3 illustrates a top view on second embodiment of a cutting disc.

FIG. 3 shows a second embodiment in accordance with the present disclosure, namely a top view of the second main surface 16, from which two cutting elements 17 and 19 protrude. Reference signs corresponding to those in FIGS. 1 and 2 indicate similarities.

The two cutting elements 17 and 19 may be attached to the main surface 16 with rivets or screws 18. The two cutting elements 17 and 19 are blades with straight cutting edges 15 and 20, respectively. Seen in the circumferential direction, the two cutting elements 17 and 19 are arranged in a comparatively great distance in order to achieve uniform rotation behavior. The angle of rotation between the two cutting elements 17 and 19 is always at least 90°, regardless of the direction of rotation. The cutting element 17 is thus located in one half of the cutting disc 1 and all other cutting elements 3, 4, 5, 19 in another half of the cutting disc 1.

If the cutting disc 1 is rotated counterclockwise in a second direction of rotation, the cutting element 17 with the straight cutting edge 15 chops a food product lying against the main surface 16 into slice form. The cutting edge 15 protrudes, for example, 1 mm from the main surface 16. The thickness of a slice separated from a food product is therefore approx. 1 mm. If the cutting disc 1 is rotated clockwise in a first direction of rotation, the cutting element 19 with the straight cutting edge 20 chops a food product lying against the main surface 16 in slice form. The cutting edge 20 protrudes, for example, 4 mm from the main surface 16. The thickness of the slices separated from a food product is therefore approx. 4 mm. Depending on the direction of rotation of the cutting disc 1, slices of different thickness can therefore be separated from a food product. Already in the first embodiment shown in FIGS. 1 and 2, the cutting element 4 and the cutting element 19 share a common through opening 12. In FIG. 3, the part of the cutting element 4, which can be attached to the opposite main surface by rivets or screws 18, is shown dashed.

From the rear, the cutting elements 3 and 5 can be seen through the through openings 11 and 13. In the front, there are only two adjacent cutting elements 5 in the first row. The first row is adjacent to the center 21 of the cutting disc 1. This first row of cutting elements 5 has a large distance to the outer edge of the cutting disc 1. The second row of cutting elements 5 again extends to the center but still has a clear distance to the outer edge of the cutting disc 1. In this case, six cutting elements 5 are shown in the second row. The first row of cutting elements 5 forms an acute angle with the second row of cutting elements 5 to convey a food product further in an improved manner to the outer edge.

Behind the second row of cutting elements 5 is a third row of cutting elements 5 extending from the outer edge of the cutting disc 1 to the center 21. A total of nine cutting elements 5 are shown in the third row as an example. A fourth row of cutting elements 5 located behind it extends to the outer edge of the cutting disc 1 but no longer to near the center 21 of the cutting disc 1. A total of seven cutting elements 5 are shown in the fourth row by way of example. A fifth row of cutting elements 5 comprises only three cutting elements 5 close to the outer edge of the cutting disc 1. All rows enclose an acute angle between one another in such a way that conveying of a food product to the outer edge of the cutting disc 1 is supported.

The curved cutting edges 9 of the cutting elements 3 do not run parallel to each other or to an imaginary line, but approximately parallel to an imaginary arc, in order to convey a food product further to the outer edge in an improved manner. In other words, if the cutting edges 9 of the cutting elements 3 were placed next to each other without changing their orientation, a kind of arc shape would be formed.

The cutting disc 1 in FIG. 3 is shown without a shaft. It can be seen that there is a central approximately square opening 22 surrounded by four elongated holes 23, i.e. four elongated openings. These openings allow a shaft formed from two parts to be detachably connected to the cutting disc 1.

Figure 4:
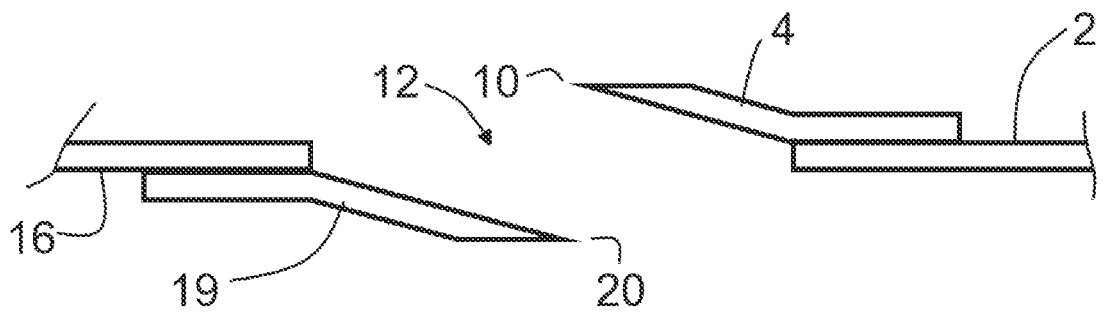
FIG. 4 illustrates a sectional view through a section of the cutting disc shown in FIG. 3.

The cutting element, which belongs to the through opening 6, has a relatively large distance to the cutting element FIG. 4 shows a section through a section of the cutting disc of FIG. 3 in the area of the through opening 12. FIG. 4 illustrates that the cutting elements 4 and 19 share the through opening 12.

Figure 5:
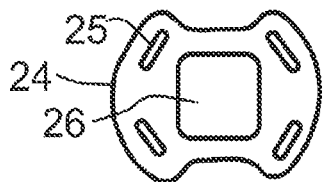
FIG. 5 illustrates a top view on a first part of a shaft.
Figure 6:
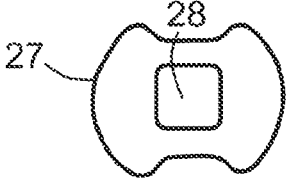
FIG. 6 illustrates a top view on a second part of a shaft.

FIG. 5 shows a top view of the underside 24 of one part of the two-part shaft. FIG. 6 shows the underside 27 of the other part of the two-part shaft. Both undersides are placed opposite each other on the cutting disc.

One underside 24 has protruding webs 25, elongated in section, which are inserted into the openings 23 of the cutting disc 1 shown in FIG. 3 when the underside 24 is placed on the cutting disc. This allows torque to be transmitted from the shaft to the cutting disc 1. There is also an approximately square central opening 26 that is similar to the central approximately square opening 22 of the cutting disc 1 shown in FIG. 3.

The underside 27 of the second part of the shaft has a web 28 which is approximately square in section and can be inserted through the central opening 22 of the cutting disc 1 into the central opening 26 of the first part of the shaft, for example by clamping. Alternatively or in addition to a clamping connection, one or more latching projections may be provided, for example, on the lateral wall of the web 28, which is approximately square in section, which can latch with recesses corresponding thereto within the opening 26 of the first part of the shaft. The two parts of the shaft can thus be connected to each other, for example, in a force-fitting and/or form-fitting manner. However, the two parts of the shaft can also be bonded to each other and/or glued to the main surfaces 2, 16 and thus permanently connected to each other.

Figure 7:
FIG. 7 illustrates an example of a curved course of a cutting edge.
Figure 8:
FIG. 8 illustrates another example of a curved course of a cutting edge.
Figure 9:
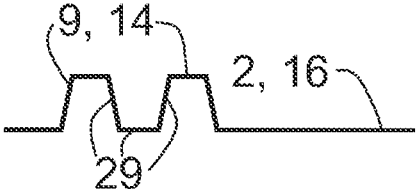
FIG. 9 illustrates another example of a curved course of a cutting edge.

FIGS. 7 to 9 show examples of a curved path of a cutting edge 9, 14 chopping a food product typically in strip form. The maximum height of the cutting edges 9, 14 shown in FIGS. 7 to 9 is similar to the maximum width of the cutting edges 9, 14. In none of the cases shown is the maximum height a multiple of the maximum width or vice versa.

In FIG. 7 an arcuate course of the cutting edge 9, 14 is shown. The maximum height slightly exceeds the maximum width.

In FIG. 8, an angular profile of the cutting edge 9, 14 is shown, which approximates an arcuate profile. The cutting edge 9, 14 comprises five legs. Two adjacent legs, which merge into a corner, enclose an angle which is 45°. The maximum width of the cutting edge 9, 14 slightly exceeds the maximum height.

In FIG. 9, an angular course of two cutting edges 9, 14 is shown, each approximating an arcuate course. Each cutting edge 9, 14 comprises three legs. Two adjacent legs which merge into a corner enclose an angle which lies between 80° and 90°. The maximum width of each cutting edge 9, 14 corresponds to the maximum height. The contour 29 between the two cutting elements with the cutting edges 9, 14 may correspond to a cutting edge 9 rotated by 180°, as shown in FIG. 9, in order to obtain uniformly shaped strips in the case of the cutting elements 3, 4 lying behind one another.

Figure 10:
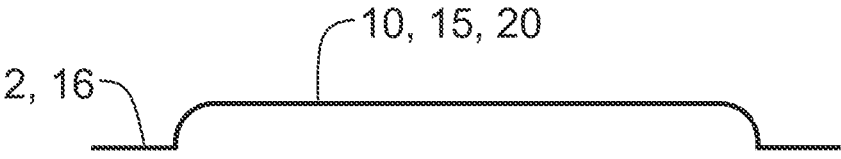
FIG. 10 illustrates an example of a straight course of a cutting edge.

FIG. 10 shows an example of a straight cutting edge 10, 15, 20. It is true that in the edge region of the cutting edge, respectively, there is an arc shape. In contrast to the curved courses, however, the course is predominantly straight, which has the consequence that a food product is typically chopped in slice form. The maximum width of the cutting edge 10, 15 exceeds the maximum height by many times.

FIGS. 7 to 10 show top views of the cutting edges.

In one embodiment, first cutting elements having first equal cutting edges and a second cutting element having a second cutting edge are provided on the first side, wherein the first cutting edges are different from the second cutting edge.

The first cutting edges are preferably arcuate and the second cutting edge is preferably straight. Although a cutting edge with straight course cuts a food product in principle into slices, this embodiment has the consequence that a food product can be chopped at least practically completely in strip form. If the first cutting edges have cut strips out of a food product, the surface of the food product that then lies against the first surface of the cutting disc is strip-shaped. If this strip-shaped surface is now cut off by means of a straight cutting edge, it is again strips which been cut off from the food product. With this embodiment, it can therefore be achieved to chop a food product almost completely in strip form, even though a straight cutting edge is also involved in the chopping process. This embodiment makes it possible to achieve particularly smooth running.

Preferably, the contour between two cutting elements with curved cutting edges corresponds to a cutting edge rotated by 180°. The maximum width of the contour is then equal to the maximum width of the curved contour or at least is essentially equal. Particularly uniformly shaped strips can then be obtained.

Preferably, there is a small distance between the different cutting elements lying one behind the other. This means that along the circular path there are two different distances between cutting edges of different cutting elements lying one behind the other and thus in a direction of rotation along a circular arc. Seen in the first direction of rotation, a first distance from a first cutting element to the second cutting element behind it is small, and viewed in the direction of rotation, a second distance from the second cutting element to the first cutting element behind it is large. The second distance is in particular many times greater than the first distance, preferably at least three times as great, particularly preferably at least five times as great. This ensures that the cutting elements lying one behind the other practically always chop in a desired sequence, for example practically always first by a plurality of cutting elements with curved cutting edges and subsequently by a single cutting element with a straight cutting edge. This applies to the case where the cutting disc is rotated in the first direction of rotation. Instead of a single cutting element with a straight cutting edge, it is also possible to have two cutting elements with a straight cutting edge next to each other. However, this is associated with a higher manufacturing effort, so that the provision of only one cutting element with a straight cutting edge is preferable. This is then preferably at least half as long as the radius of the cutting disc, preferably at least ¾ as long, in order to be able to cover large areas. However, a division into two cutting elements with a straight cutting edge can be advantageous if this supports a desired conveying direction of an adjacent food product, for example to the outer edge of the disc.

In the case of a small distance, the distance between cutting edges of cutting elements lying one behind the other that are not identical may be no more than 80 mm, preferably not more than 60 mm. Seen in the cutting direction, first cutting edges of cutting elements are then preferably curved and a cutting edge of a cutting element lying behind them is straight. In this way, practically only strips can be cut out of a food product in an improved manner with a very smooth running.

The maximum height of the cutting edges relative to the adjacent main surface of the cutting disc is preferably at least 2 mm. If a straight cutting edge runs parallel to the main surface, the entire straight cutting edge is at least 2 mm above the main surface. If a cutting edge runs arcuate, then at least a highest point of the arcuate cutting edge is at least 2 mm above the main surface from which the associated cutting element protrudes. It has been found that in particular cutting elements protruding relatively far from a main surface can cause uneven running. This means that with such cutting elements, there is a special need to provide for improved running smoothness. For this reason, the maximum height of the cutting edges of the cutting elements relative to the adjacent main surface is preferably at least 2 mm, and particularly preferably at least 3 mm, since this is the most relevant application.

The maximum height of the cutting edges that can chop a food product when the cutting disc rotates in the first direction of rotation is preferably the same. It is then advantageous that pieces of the same thickness can always be cut from a food product. A uniform cutting result can thus be obtained.

One or more further cutting elements may be present on the first side of the cutting disc. The one or more further cutting elements can chop food products by rotating the cutting disc in a second direction of rotation. The first direction of rotation is opposite to the second direction of rotation. The one or more further cutting elements are different from the cutting elements that can chop a food product when rotation is performed in the first direction of rotation. By selecting the direction of rotation, different cutting results can therefore be achieved. With only one cutting disc, the number of chopping possibilities can be advantageously increased.

The one or more further cutting elements that can chop food products by rotating the cutting disc in the second direction of rotation may, for example, have curved cutting edges.

Preferably, the maximum height of these curved cutting edges is less than the height of curved cutting edges that can chop a food product rotation is performed in the first direction of rotation. This advantageously ensures that even when rotating in the second direction of rotation, running is not excessively uneven. The cutting edges, which can chop food products by rotating the cutting disc in the second direction of rotation, therefore preferably protrude less than 2 mm from the adjacent main surface of the cutting disc in order to avoid excessively uneven running. Strips cut from the cutting edges dimensioned in this way are then thinner than 2 mm. The width of these strips then depends on the width of the cutting edges.

On the second side of the cutting disc, opposite to the first side, there may be one or more cutting elements that can chop food products when the cutting disc is rotated in the first direction of rotation. There may be one or more second cutting elements that can chop food products when the cutting disc is rotated in the opposite second direction of rotation. The second side of the cutting disc can thus also be used advantageously for chopping food products. This is particularly advantageous if the cutting elements on the second side are different from the cutting elements on the first side. It is then possible to select even more variably how a food product is to be chopped. For this reason, the cutting elements on the second side, which can chop a food product in the first direction of rotation, are preferably also different from the cutting means on the second side, which can chop a food product by rotating in the second direction of rotation opposite thereto.

The cutting edges of the cutting elements on the second side are straight, for example. The cutting elements on the second side can then chop a food product in slice form. Overall, a cutting disc is then provided that can chop both in strip form and in slice form. A food product, which lies against the first side of the cutting disc, can then preferably only be chopped in strip form. Depending on the direction of rotation, thinner or thicker strips can be obtained. A food product, which lies against the second side of the cutting disc, can then preferably only be chopped in slice form. Depending on the direction of rotation, thicker or thinner slices can be obtained. By selecting the side, it can therefore be decided whether a food product is to be chopped in strip form or in slice form. By selecting the direction of rotation, the thickness can be selected. For reasons of clarity, it is advantageous that a respective side of the cutting disc is equipped with cutting elements in such a way that a food product can be chopped either practically only in strip form or practically only in slice form.

In a cutting disc, each cutting element has a through opening through which a chopped food product can pass through the disc. Preferably, there are cutting elements with straight cutting edges that have a common through opening and are located on opposite sides of the cutting disc. The number of through openings and thus the manufacturing effort can thus be kept low.

Cutting elements having arcuate cutting edges are preferably integrally joined to the rest of the cutting disc. These cutting elements have not been produced separately from the rest of the cutting disc and joined to the rest of the cutting disc after producing. These cutting elements may have been manufactured by punching and forming a sheet.

Cutting elements having straight cutting edges may have been manufactured separately and then connected to the remaining part of the cutting disc. This may have been done by riveting, for example. Alternatively, cutting elements having straight cutting edges can also have been punched and formed from a sheet. However, there may then be a deviation from the straight course at the edges. Nevertheless, the cutting edges are still predominantly straight.

In one embodiment, there is a shaft that protrudes equally from both main surfaces of the cutting disc. This embodiment facilitates to use both sides of the cutting disc for chopping, since the length of the shaft is independent of the insertion direction of the cutting disc.

The shaft may comprise identical coupling elements at its ends. The shaft can then be coupled to the shaft of a motor, for example, to drive the cutting disc via a motor. The provision of identical coupling elements makes it easier to use both sides of the cutting disc for chopping, since no adaptation of coupling elements is required.

A coupling element may comprise a star-shaped inner circumference, for example. Such a coupling element may be coupled to a coupling element having an correspondingly dimensioned star-shaped outer circumference in a rotationally fixed manner. A coupling element may comprise a star-shaped outer circumference, for example. Such a coupling element may be coupled to a coupling element having a correspondingly dimensioned star-shaped inner circumference in a rotationally fixed manner. For coupling, it is sufficient for one coupling element to be inserted into the other. Instead of a star shape, other non-rotationally symmetrical shapes can be provided for the outer or inner circumference. For example, the respective inner circumference of the coupling elements of the shaft may be square, which can respectively be coupled to another coupling element in a rotationally fixed manner by insertion, wherein the other coupling element should then have a square inner circumference.

Preferably, cutting elements of the cutting disc are arranged and/or oriented such that they can centrifugally convey a food product towards the adjacent outer side of the cutting disc when the cutting disc is rotated. This embodiment can promote a uniform feed of a food product to the cutting disc and thus contributes to good cutting results.

Preferably, there is a cutting device that can chop up food products using the cutting disc. The cutting device comprises a motor by which the cutting disc can be rotated both clockwise and counterclockwise. The shaft of the motor can preferably be releasably connected to the shaft attached to the cutting disc via coupling elements. The coupling elements are such that the two shafts can be connected to each other in a rotationally fixed manner in the direction of rotation. A fixed connection in the axial direction is not absolutely necessary.

The cutting device may comprise a filler neck via which a food product can be fed to the cutting disc. If a food product is fed to the cutting disc via the filler neck and the cutting disc rotates, the food product fed in is chopped.

The feed spout may comprise two chutes. A food product can then be fed to the cutting disc via each chute. The two chutes may be separated from each other by a common wall.

The invention claimed is:

1. A cutting disc configured to chop a food product by rotating about an axis, the cutting disc comprising:

cutting elements disposed on a first side of the cutting disc and configured to chop the food product by rotating the cutting disc in a first direction of rotation, wherein the cutting elements are arranged one behind the other when viewed in the first direction of rotation, and wherein the cutting elements arranged one behind the other are different, wherein the first side of the cutting disc defines a main surface, wherein each of the cutting elements is fixedly connected to the remaining cutting disc, and each of the cutting elements is configured to chop the food product when the cutting disc is rotated in the first direction of rotation, and wherein each of the cutting elements includes a cutting edge that has a portion that is spaced apart from the main surface so as to define a space between the portion and the main surface such that at least one portion of the food product is configured to enter the space when the cutting disc is rotated in the first direction of rotation and be separated entirely from the food product.

2. The cutting disc of claim 1, wherein at least some of the cutting elements have a curved cutting edge.

3. The cutting disc of claim 2, wherein a contour between two cutting elements of the cutting elements having curved cutting edges corresponds to a cutting edge rotated by 180°.

4. The cutting disc of claim 3, wherein the cutting edges of the cutting elements run approximately parallel to an imaginary arc.

5. The cutting disc of claim 1, wherein a cutting element of the cutting elements has a straight cutting edge.

6. The cutting disc of claim 2, wherein a distance between cutting edges of the cutting elements lying one behind the other is not more than 80 mm and wherein the curved cutting edges of the cutting elements lie in front when viewed in the first direction of rotation and at least one of the cutting elements with a straight edge is disposed behind the cutting elements.

7. The cutting disc of claim 2, wherein a maximum height of the cutting edges relative to an adjacent main surface of the cutting disc is at least 2 mm.

8. The cutting disc of claim 2, wherein the maximum height of the cutting edges is the same.

9. The cutting disc of claim 1, wherein the first side includes one or more additional cutting elements configured to chop the food product by rotating the cutting disc in a second direction of rotation, and wherein the first direction of rotation is opposite to the second direction of rotation.

10. The cutting disc of claim 9, wherein the additional cutting elements, which can chop the food product by rotating the cutting disc in the second direction of rotation, have curved cutting edges.

11. The cutting disc of claim 10, wherein the cutting edges, which can chop the food product by rotating the cutting disc in the second direction of rotation, protrude less than 2 mm from the adjacent main surface of the cutting disc.

12. The cutting disc of claim 1, wherein on a second side of the cutting disc which is opposite to the first side, there are one or more first cutting elements, which can chop the food product when the cutting disc is rotated in the first direction of rotation, and one or more second cutting elements which can chop the food product when the cutting disc is rotated in the second direction of rotation opposite thereto, wherein the one or more first cutting elements are different from the one or more second cutting elements.

13. The cutting disc of claim 12, wherein the cutting edges of the cutting elements on the second side are straight.

14. The cutting disc of claim 1, wherein several cutting elements define a common through opening, which are located on opposite sides of the cutting disc.

15. The cutting disc of claim 1, there is further comprising a shaft for the cutting disc which protrudes equally from both main surfaces of the cutting disc and which comprises identical coupling elements at opposing ends of the shaft.

16. The cutting disc of claim 1, wherein each of the cutting elements is fixedly connected to the remaining cutting disc so as to be irremovable from the remaining cutting disc.

17. The cutting disc of claim 1, wherein the cutting elements include at least one first cutting element and at least one second cutting element, wherein the at least one first cutting element is arranged forward of the at least one second cutting element and includes a first through opening located at least partially below a cutting edge of the at least one first cutting element, wherein the at least one second cutting element is arranged behind the at least one first cutting element and includes a second through opening located at least partially below a cutting edge of the at least one second cutting element, and wherein at least a portion of the cutting edge of the first cutting element extends over the first through opening and at least a portion of the cutting edge of the second cutting element extends over the second through opening such that the at least one portion of the food product chopped by the at least one first and second cutting elements is configured to fall through the first and second through openings.

18. The cutting disc of claim 1, wherein the cutting elements include at least one first cutting element and at least one second cutting element, wherein a cutting edge of the at least one first cutting element is arranged forward of the at least one second cutting element in the first direction of rotation and has an arcuate shape with a cutting edge that extends from a first end to a second end opposite the first end, and wherein the first end and the second end are each connected to the main surface of the cutting disc.

19. The cutting disc of claim 1, wherein the portion of the cutting edge that is spaced apart from the main surface of each of the cutting elements extends in a direction that is perpendicular to the first direction of rotation and in a direction from the outer edge of the cutting disc to a center of the cutting disc, and wherein the portion extends either at an angle to or parallel to the main surface so as to not be orthogonal to the main surface.

20. A cutting disc configured to chop a food product by rotating about an axis, the cutting disc including cutting elements disposed on a first side of the cutting disc and configured to chop the food product by rotating the cutting disc in a first direction of rotation, wherein the cutting elements are arranged one behind the other when viewed in the first direction of rotation, and wherein the cutting elements arranged one behind the other are different, wherein each of the cutting elements is fixedly connected to the remaining cutting disc, and each of the cutting elements is configured to chop the food product when the cutting disc is rotated in the first direction of rotation, wherein each of the cutting elements is oriented on the cutting disc so as to separate at least one portion of the food product entirely from the food product, and wherein the cutting elements include at least one first cutting element and at least one second cutting element, wherein the at least one first cutting element is arranged forward of the at least one second cutting element and includes a first through opening located at least partially under the at least one first cutting element, and the at least one second cutting element is arranged behind the at least one first cutting element and includes a second through opening located at least partially under the at least one second cutting element.

\* \* \* \* \*